US005603108A

United States Patent [19]

Thoone

[11] Patent Number: 5,603,108

[45] Date of Patent: Feb. 11, 1997

[54] CONTROL SECTION FOR AN RDS-TMC RADIO RECEIVER

[75] Inventor: Martin Thoone, Braunfels, Germany

[73] Assignee: U.S. Philips Corporation, New York, N.Y.

[21] Appl. No.: 359,368

[22] Filed: Dec. 20, 1994

[30] Foreign Application Priority Data

Dec. 23, 1993 [DE] Germany .......................... 43 44 173.4

[51] Int. Cl.$^{6}$ .......................... H04B 1/18

[52] U.S. Cl. .......................... 455/186.1; 455/226.2

[58] Field of Search .......................... 455/185.1, 186.1, 455/226.2, 184.1, 186.2, 161.1, 166.2, 45, 345, 153.1; 340/905

[56] References Cited

U.S. PATENT DOCUMENTS

| | | | |
|---|---|---|---|
| 4,792,803 | 12/1988 | Madnick et al. | 340/905 |
| 4,833,728 | 5/1989 | Kimura et al. | 455/184.1 |
| 4,907,159 | 3/1990 | Mauge et al. | 364/436 |
| 5,020,143 | 5/1991 | Duckeck et al. | 340/905 |
| 5,270,708 | 12/1993 | Kamishima | 340/905 |
| 5,317,403 | 5/1994 | Keenan | 455/185.1 |
| 5,438,687 | 8/1995 | Suchowerskyj et al. | 340/905 |
| 5,475,874 | 12/1995 | Klos | 455/186.1 |

FOREIGN PATENT DOCUMENTS 3536820 4/1987 Germany .

OTHER PUBLICATIONS

United States RBDS Standard Draft No. 2.0, NRSC Document, pp. 65–66 Aug. 1992.

"Verkehrsmeldungen Sprachgespeichert" by T. Menzel et al., Radio Fernsehen Elektronik, Bd. 42, Nr. 5, Mai 1993, Berlin De Seiten 21–22.

"Handleiding Volvo 850 1993", 1992, Volvo Car Corporation, Goteborg, Sweden.

"Rhine–Corridor an RDS–TMC Pilot For Radio Traffic Information", VNIS'92, Vehicle Navigation & Information Systems, Sep. 2–4, 1992, IEEE US Seiten 8–13.

"Vehicle Communications in Europe", International Congress On Transportation Electronics Proceedings, Oct. 17–18, 1988, IEEE US Seiten 229–235.

*Primary Examiner*—Reinhard J. Eisenzopf
*Assistant Examiner*—Marsha D. Banks-Harold
*Attorney, Agent, or Firm*—Bernard Franzblau

[57] ABSTRACT

A control section for a radio receiver receives and decodes information transmitted in coded form in the Radio Data System (RDS) in its Traffic Message Channel (TMC). The control section, which should simplify access to the transmitted information, has an information key and/or an area key and/or storage keys. The information key can activate a plurality of functions. The area key and the storage keys provide access to information about selected areas.

12 Claims, 1 Drawing Sheet

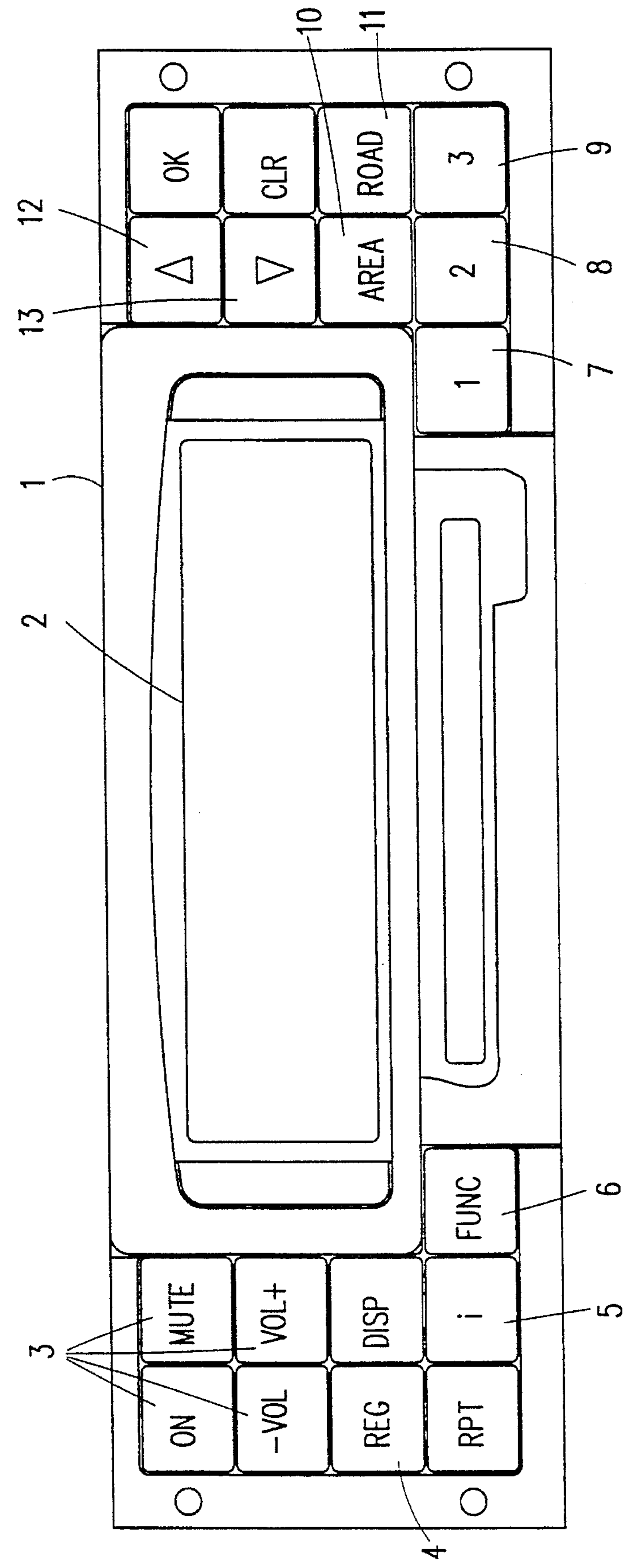
OK
CLR
ROAD
3
AREA
2
1
FUNC
MUTE
VOL+
DISP
i
ON
-VOL
REG
RPT

CONTROL SECTION FOR AN RDS-TMC RADIO RECEIVER

BACKGROUND OF THE INVENTION

This invention relates to a control section for a radio receiver which receives and decodes information transmitted in coded form in the Radio Data System (RDS) in its Traffic Message Channel (TMC).

A driver normally has to go through lengthy and complex routines in order to extract the desired information from the multitude of data in the RDS-TMC system, which will distract him from driving.

German Patent DE 3,536,820 describes a receiver which, after it has been switched on, reproduces the previously received, decoded and stored traffic messages one time. Subsequently, the latest messages are reproduced. Earlier messages are not repeated. Thus, when the receiver is switched on the whole sequence of traffic messages is reproduced once.

U.S. Pat. No. 4,907,159 discloses a control section for an RDS receiver, comprising an LCD screen and a plurality of keys for selection of the desired information. The received traffic messages are stored arranged according to areas. Nevertheless, the driver each time has to specify the preferential area because the receiver is not capable of storing and retrieving the desired area about which the driver wishes to receive information.

SUMMARY OF THE INVENTION

It is an object of the invention to provide a control section for a radio receiver which allows given desired information to be accessed simply with a minimal number of operations.

In a first embodiment of the invention this object is achieved in that the control section has an information key which, when actuated for the duration of a first time interval, causes the received, decoded and previously stored information to be reproduced, and which, when actuated for the duration of a second time interval, searches other RDS-TMC stations than the currently received station.

There is only one information key for the central control functions. The time interval during which the key is pressed provides a choice between different items of information or different functions. If the key is now actuated for the duration of a first time interval the previously received information, which is decoded and stored in the receiver, is retrieved, i.e. reproduced. However, if the key is now actuated for the duration of a second time interval the receiver will search other RDS-TMC stations than the one currently received. In the simplest case operation of the RDS-TMC receiver, i.e. its control section, merely requires the actuation of this key, by means of which the desired information can be fetched at any time and by means of which it is also possible to select other stations. All the previously received, decoded and stored information can be retrieved by the driver whenever desired, no special concentration on the information retrieval being required from the driver, so that his attention is not diverted from the traffic.

In a second embodiment the object of the invention is achieved in that the control section has an area key upon whose actuation only that information is reproduced which corresponds to the area in which the radio receiver is situated.

If it is desired not to recall all of the information by one key stroke, the area key offers the advantage that only the required information is obtained, i.e. the information which is relevant to the area in which the receiver is located. For example, in the case of traffic information not all the information relating to the entire Federal German Republic is of interest but merely that relating to the Greater Hamburg area. The driver therefore need not listen to all the information but can concentrate on the information which is relevant to him. This is possible by the simple actuation of a key. In addition, it has the advantage that the smaller amount of information can be updated more rapidly. In a variant of the second embodiment the area in which the receiver is situated can be derived from the frequency of the received station and/or the alternative frequencies transmitted in the RDS information.

In conjunction with the radio receiver control section in accordance with the invention the method, known per se, of determining the area in which the receiver is situated has the advantage that this information can be utilized for the selection of the RDS-TMC information. Actuation of the area key then only starts the reproduction of the information relating to the present area. This requires no user action to select or enter the area in which the vehicle is located.

In a third embodiment the object of the invention is achieved in that the control section comprises storage keys by means of which selected areas and/or selected itineraries can be stored and upon whose actuation only that information is reproduced which corresponds to the areas and or itineraries stored under an actuated key.

The storage keys enable given areas and/or itineraries to be stored under each of them. Actuation of one of these storage keys then causes only the information assigned to the actuated key to be reproduced. The advantage for the user of the radio receiver or the control section for this receiver is that the user only has to select and store the areas and/or itineraries under a storage key and that subsequently the information can be accessed at any time by simply pressing the storage key. Thus, it is possible, for example, to retrieve in advance the information for a planned itinerary where the receiver is not (yet) situated. Moreover, the preferred areas and/or itineraries have to be entered only once by the driver.

In a variant of this embodiment of the invention the areas and/or itineraries to be stored under a storage key can be selected from a selection list. Thus, it is not necessary to enter separate characters but instead it is possible to select the desired areas and/or itineraries from a list.

DESCRIPTION OF THE PREFERRED EMBODIMENTS

The control panel 1 of this receiver has several groups of keys.

A first group of keys 3 comprises keys with general control functions, such as for example on/off, muting and volume. These keys serve for the general control of the apparatus, i.e. not for the RDS functions.

A further group of keys includes an area key 4, an information key 5 and a function key 6 provided for future services of the RDS-TMC system (for example, information relating to regional public transport, park & ride facilities).

At the fight the control panel 1 has a group of storage keys 7, 8 and 9 with associated selector keys 10, 11, 12 and 13.

After the radio receiver has been tuned to an FM station transmitting RDS-TMC information the correctly received messages are stored in the receiver.

Now it is possible to reproduce the stored information by actuating the info key 5. The info key has a double function. When it is actuated for the duration of a first time interval all the decoded messages received and stored in the receiver until then are reproduced one time. This can be effected, for example, by means of a speech synthesis system, not shown, which acoustically reproduces the information by means of an artificial voice.

Messages which update or overrule information already stored can then be reproduced directly, i.e. without actuation of the information key 5.

If the information key 5 is actuated for the duration of a second time interval, which is preferably longer than the first time interval, the receiver will search another RDS-TMC station than the one currently received. Once a new station has been found its frequency and/or its name is displayed and the user can retrieve the information from this station by actuating the information key 5.

The information key 5 consequently has two functions selected by means of the duration of the actuation time of this key.

If the area key 4 of the control section 1 is actuated only that information is reproduced which corresponds to the area in which the radio receiver is situated.

There are several possibilities of determining the area in which the radio receiver is located. In a preferred embodiment of the invention a list of stations is stored in a memory in accordance with the nominal field strength of the stations, the radio receiver being capable of comparing the field strengths of the received stations with the field strengths of the stored stations. After an analysis of the field-strength differences the area can be determined with sufficient accuracy. Moreover, it is possible to utilize the alternative frequencies transmitted via the RDS channel of the received station. These alternative frequencies are frequencies of those stations via which the same program is transmitted as via the currently received station. From the list of alternative frequencies the location of the receiver can be derived because it is possible to determine the station currently received by the apparatus. From this information it can be determined in which area the receiver is situated and when the area key is actuated only that information from the RDS-TMC channel will be reproduced which corresponds to this area.

It may also be desirable to have not only the information relating to the area in which the radio receiver, i.e. the vehicle, is situated but, for example, also information relating to a planned itinerary or a destination area.

For this purpose the storage keys 7, 8 and 9 have been provided, under which selected areas and/or selected itineraries can be stored. When one of these keys 7, 8 or 9 is actuated the areas and/or itineraries stored underneath this key are read out and processed in such a manner that only that RDS/TMC channel information is reproduced which corresponds to the read-out areas and/or itineraries.

Thus, these storage keys enable the user to obtain in advance information about planned itineraries or areas to be visited.

These areas and/or itineraries, which should be stored under one of the keys 7, 8 or 9, can be selected by means of an area key 10, a road key 11 and two scroll keys 12 and 13, respectively. For this purpose the display 2 of the control section 1 gives a list of desired areas, itineraries or destinations. The desired areas and/or itineraries can be selected by means of the scroll keys 12 and 13. The areas and/or itineraries thus selected can then be stored under one of the keys 7, 8 or 9.

The driver can then select not just areas or itineraries but also combinations of these.

Thus, a plurality of storage keys, since there may of course be more than three keys, enable the user to select at any time information relating to given areas or itineraries. These areas and/or itineraries have to be selected only once and selection need not be repeated for each new journey.

Thus, the control section in accordance with the invention provides direct access to the desired information without intricate and repeated entries by the user.

I claim:

1. A control section for a mobile radio receiver which receives and decodes information transmitted in coded form in the Radio Data System (RDS) in its Traffic Message Channel (TMC), wherein the control section comprises an information key which, when actuated for the duration of a first time interval, causes received, decoded and previously stored information to be reproduced, and which, when actuated for the duration of a second time interval, searches for other RDS-TMC stations than the currently received ROS-TMC station.

2. A control section for a mobile radio receiver as claimed in claim 1 wherein the control section further comprises an area key upon whose actuation only that information is reproduced which corresponds to the immediate surrounding area in which the radio receiver is situated.

3. A control section for a radio receiver, as claimed in claim 2, wherein the area in which the receiver is situated is derived from the frequency of the received station and/or the alternative frequencies transmitted in the RDS information.

4. A control section for a radio receiver, as claimed in claim 1, wherein the duration of the first time interval is shorter than the duration of the second time interval.

5. A control section for a radio receiver as claimed in claim 1 wherein said information key comprises a single key with a single actuation position.

6. A control section for a radio receiver as claimed in claim 1 which further comprises a separate area key which, when actuated, causes only that information to be reproduced which corresponds to the area in which the radio receiver is situated.

7. A control section for a radio receiver as claimed in claim 6 which further comprises plural storage keys via which actuation thereof causes only selected stored areas and/or selected itineraries corresponding to an actuated storage key to be reproduced.

8. A control section for a radio receiver as claimed in claim 6, wherein the area in which the receiver is situated is derived from the frequency of the received station and/or the alternative frequencies transmitted in the RDS information.

9. A control section for a mobile radio receiver which receives and decodes information transmitted in coded form in the Radio Data System (RDS) in its Traffic Message Channel (TMC), wherein the control section comprises: an information key which, when actuated for the duration of a first time interval, causes received, decoded and previously stored information to be reproduced, and which, when actuated for the duration of a second time interval, searches for other RDS-TMC stations than the currently received RDS-TMC station, and storage keys by means of which selected areas and/or selected itineraries can be stored and upon whose actuation only that information is reproduced which corresponds to the areas and or itineraries stored in relation to an actuated key.

10. A control section for a radio receiver which receives and decodes information transmitted in coded form in the Radio Data System (RDS) in its Traffic Message Channel (TMC), wherein the control section comprises: storage keys by means of which selected areas and/or selected itineraries can be stored and upon whose actuation only that information is reproduced which corresponds to the areas and or itineraries stored in relation to an actuated key, and the areas and/or itineraries to be stored under a storage key are selected from a selection list.

11. A control section for a radio receiver as claimed in claim 9 wherein the areas and/or itineraries to be stored under a storage key are selected from a selection list.

12. A control section for a radio receiver as claimed in claim 11 wherein the control section further comprises an area key upon whose actuation only that information is reproduced which corresponds to the area in which the radio receiver is situated.

* * * * *